United States Patent
Braun et al.

(10) Patent No.: US 6,677,040 B1
(45) Date of Patent: Jan. 13, 2004

(54) EXPANDED POLYPROPYLENE PARTICLES

(75) Inventors: Frank Braun, Ludwigshafen (DE); Guiscard Glück, Mainz (DE); Klaus Hahn, Kirchheim (DE); Isidoor De Grave, Wachenheim (DE); Hermann Tatzel, Weinheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/868,044

(22) PCT Filed: Dec. 11, 1999

(86) PCT No.: PCT/EP99/09832
§ 371 (c)(1),
(2), (4) Date: Jun. 14, 2001

(87) PCT Pub. No.: WO00/37546
PCT Pub. Date: Jun. 29, 2000

(30) Foreign Application Priority Data

Dec. 22, 1998 (DE) .......................... 195 59 418

(51) Int. Cl.$^7$ ................................. B32B 5/16
(52) U.S. Cl. ................. 428/402; 428/304.4; 428/308.4; 428/314.4; 428/314.8; 428/319.1; 521/56; 521/60; 521/72; 521/82
(58) Field of Search .............................. 428/402, 304.4, 428/308.4, 314.4, 319.1, 314.8; 521/56, 60, 72, 82

(56) References Cited

U.S. PATENT DOCUMENTS

| | | | | |
|---|---|---|---|---|
| 4,496,627 A | | 1/1985 | Azuma et al. | |
| 4,638,015 A | * | 1/1987 | Bertrand | 521/85 |
| 4,650,816 A | * | 3/1987 | Bertrand | 521/85 |
| 5,660,901 A | * | 8/1997 | Wong | |
| 5,925,686 A | * | 7/1999 | Kogel et al. | 521/60 |
| 6,077,875 A | * | 6/2000 | Sasaki et al. | 521/60 |
| 6,130,265 A | | 10/2000 | Glueck et al. | |
| 6,213,540 B1 | * | 4/2001 | Tusim et al. | |
| 6,313,184 B1 | * | 11/2001 | Sasaki et al. | 521/56 |
| 6,340,713 B1 | | 1/2002 | Gluck et al. | |
| 6,362,242 B1 | | 3/2002 | Gluck et al. | |

FOREIGN PATENT DOCUMENTS

DE 197 40 472 A1 3/1999

OTHER PUBLICATIONS

Patent Abstracts of Japan, vol. 009, No. 233 (C–304), Sep. 19, 1985, JP 60 090227, May 21, 1985.

* cited by examiner

Primary Examiner—H. Thi Le
(74) Attorney, Agent, or Firm—Keil & Weinkauf

(57) ABSTRACT

The invention relates to expanded polypropylene beads having a density of from 5 to 200 g/l and a bead diameter of from 1 to 10 mm which comprise from 0.002 to 20% by weight of graphite particles.

16 Claims, No Drawings

EXPANDED POLYPROPYLENE PARTICLES

The present invention relates to expanded polypropylene beads having a density of from 5 to 200 g/l and a bead diameter of from 1 to 10 mm based on a propylene polymer. Expanded polypropylene (EPP) beads are employed on an industrial scale for the production of foam moldings. These are predominantly employed as elastic, impact-resistant packaging materials which also have thermal insulation properties. However, their thermal conductivity is still too high for some applications.

According to the prior art, polyolefin foam beads of low thermal conductivity can be produced by employing infrared-reflecting metal pigments, such as aluminum powder (DE-A 195 05 266). Disadvantages in this method are the high price and the restricted availability of the requisite pigments.

In order to produce foam moldings from EPP beads, the latter are introduced into a mold, expanded further by various methods (see, for example, DE-A 3431245) and fused to one another by means of steam or hot air. During this operation, a pressure builds up inside the molding. In order to prevent the foam cells from bursting, the molding can, after conventional cooling, only be removed from the mold when the pressure has dropped to about 0.3 bar (above atmospheric). The throughput in molding production thus depends essentially on the pressure dissipation time.

It is thus an object of the present invention to provide EPP beads which can be converted into foam moldings having reduced thermal conductivity, and to shorten the pressure dissipation time.

We have found that these objects are achieved by EPP beads which comprise from 0.002 to 20% by weight of graphite particles in homogeneous distribution. In order to reduce the thermal conductivity, amounts of from 1 to 20% by weight are preferred, in particular from 2 to 10% by weight, for shortening the cooling time from 0.002–10% by weight, in particular from 0.005 to 5% by weight. During molding production, shrinkage occurs if the graphite content is too high, i.e. the moldings shrink after production. If this is to be prevented, the amount of graphite must be kept low. In this case, amounts of from 0.002 to 0.2% by weight are preferred.

For the purposes of the present invention, propylene polymers are homopolypropylene and random copolymers of propylene with up to 15% by weight, preferably from 0.5 to 12% by weight, of ethylene and/or a $C_4$–$C_{10}$-α-olefin, preferably a copolymer of propylene with from 0.5 to 6% by weight of ethylene or 1-butene or a terpolymer of propylene, from 0.5 to 6% by weight of ethylene and from 0.5 to 6% by weight of 1-butene.

The propylene polymers are prepared by conventional processes using Ziegler-Natta catalysts and are generally obtained in the form of linear polymers. For the extrusion foaming process described below, branched propylene polymers, for example in accordance with EP-A 588 321, are also suitable. Propylene polymers prepared using metallocene catalysts, in accordance with EP-A 611 795, may also advantageously be employed. These propylene polymers are mixed with the graphite particles by conventional methods in the melt, preferably in an extruder. These graphite particles preferably have a particle size of from 1 to 200 μm, in particular from 1 to 50 μm. Expandable graphite can also advantageously be employed.

The EPP beads according to the invention are produced by the impregnation or foam extrusion process known per se. In the impregnation process, granulated polypropylene containing graphite particles is suspended in water together with from 1 to 40% by weight, preferably from 5 to 30% by weight, of a volatile blowing agent. Suitable blowing agents are hydrocarbons, for example butane, pentane, cyclopentane, cyclohexane or ethanol, furthermore gases, such as carbon dioxide, noble gas, air or nitrogen, and mixtures of these blowing agents. The impregnation is preferably carried out in a tubular reactor at temperatures from 100 to 160° C. under a pressure of from 10 to 100 bar and residence times of from 30 to 180 minutes. The pressure is subsequently released, and the foam beads form.

In the extrusion process, the propylene polymer together with the graphite particles and from 2 to 30% by weight of blowing agent is melted at from 120 to 240° C. in an extruder, during which it is dissolved. After a residence time of from 0.5 to 90 minutes, the blowing agent-containing polymer is extruded through a die with expansion and is granulated.

Besides the graphite particles, conventional additives, such as dyes, pigments, nucleating agents, stabilizers, flame retardants, lubricants and antistatics, can be added to the propylene polymer.

The EPP beads according to the invention have a density of from 5 to 200 g/l, preferably from 15 to 120 g/l, and a particle diameter of from 1 to 10 mm. They are predominantly closed-cell with a cell count of preferably from 5 to 500 cells per mm.

The EPPs can be fused by conventional methods with a short pressure dissipation time using steam or hot air to give foam moldings, which are used where, besides the elastic properties, good thermal insulation is also important. Examples which may be mentioned are refrigerator insulation and packaging of heating circuit distributors, which are mounted together with the packaging material.

EXAMPLE 1 (COMPARISON)

In a closed tubular reactor, 60 parts by weight of a granular propylene-ethylene random copolymer having an ethylene content of about 2% by weight and 2 parts by weight of tricalcium phosphate were dispersed in 165 parts of water. After addition of 12 parts by weight of butane, the reactor was heated to about 130° C., during which the pressure rose to about 20 bar. The reactor contents were subsequently decompressed in an intermediate tank. After removal of the tricalcium phosphate and drying, the resultant foam beads had a bulk density of 16.8 g/l. The beads were introduced into a closed mold and fused using steam under pressure to give moldings having a density of 30 g/l. The pressure dissipation time was 130 seconds, and the shrinkage was 2.4%. The thermal conductivity in accordance with DIN 52612 was measured as 40 mW/(m*K).

EXAMPLE 2

In an extruder, 2% by weight of graphite (particle size about 20 μm) were incorporated into the polymer granules from example 1. The impregnation was then carried out analogously to example 1. Foam beads having a bulk density of 17 g/l were obtained. On conversion into a molding having a density of 30 g/l, a pressure dissipation time of 50 seconds was observed. The shrinkage was 3.5%. The thermal conductivity in accordance with DIN 52612 was 34 mW/(m*K).

EXAMPLE 3

In an extruder, 0.05% by weight of graphite (particle size about 20 μm) were incorporated into the polymer granules from example 1. The impregnation was carried out analogously to example 1. Foam beads having a bulk density of 17.1 g/l were obtained. On conversion into a molding having a density of 30 g/l, a pressure dissipation time of 60 seconds was observed with a shrinkage of 2.5%. The thermal conductivity in accordance with DIN 52612 was 39 mW/(m*K).

We claim:

1. Expanded polypropylene (EPP) beads having a density of from 5 to 200 g/l and a particle diameter of from 1 to 10 mm, which comprise from 0.002 to 20% by weight of graphite particles in a homogeneous distribution.

2. EPP beads as claimed in claim 1, wherein the propylene polymer is selected from homopolypropylene and a random copolymer of propylene with up to 15% by weight of ethylene and/or a $C_4$–$C_{10}$-α-olefin.

3. The expanded polypropylene beads of claim 2, comprising a copolymer of propylene with from 0.5 to 6 wt. % of ethylene or 1-butene.

4. The expanded polypropylene beads of claim 2, comprising a terpolymer of propylene, 0.5 to 6 wt. % of ethylene and 0.5 to 6 wt. % 1-butene.

5. EPP beads according to claim 1, wherein the graphite has a particle size of from 1 to 200 μm.

6. The expanded polypropylene beads of claim 1, comprising 1 to 20% by weight of said graphite particles.

7. The expanded polypropylene beads of claim 1, comprising 2 to 10% by weight of said graphite particles.

8. The expanded polypropylene beads of claim 1, comprising 0.002 to 10% by weight of said graphite particles.

9. The expanded polypropylene beads of claim 1, comprising 0.005 to 5% by weight of said graphite particles.

10. The expanded polypropylene beads of claim 1, comprising 0.002 to 0.2% by weight of said graphite particles.

11. The expanded polypropylene beads of claim 1, wherein said beads have a density of from 15 to 120 g/l.

12. The expanded polypropylene beads of claim 1, wherein said beads are predominantly closed-cell.

13. The expanded polypropylene beads of claim 1, wherein said beads are predominantly closed-cell with a cell count of from 5 to 500 cells per mn.

14. A process for the production of EPP beads according to claim 1 by impregnation of propylene polymer granules comprising graphite particles with from 2 to 40% by weight of a volatile blowing agent in aqueous suspension under pressure at temperatures of from 100 to 160° C., followed by decompression.

15. A process for the production of EPP beads as claimed in claim 1 by extrusion of the propylene polymer together with graphite particles and from 2 to 30% by weight of a volatile organic blowing agent at temperatures of from 120 to 240° C., and granulation of the resultant foam extrudate.

16. A process for the production of foam moldings by fusing the EPP beads as claimed in claim 1 in a mold.

* * * * *

UNITED STATES PATENT AND TRADEMARK OFFICE
CERTIFICATE OF CORRECTION

PATENT NO. : 6,677,040 B1
DATED : January 13, 2004
INVENTOR(S) : Braun et al.

It is certified that error appears in the above-identified patent and that said Letters Patent is hereby corrected as shown below:

<u>Title page,</u>
Item [30], Foreign Application Priority Data,
"195 59 418" should be -- 198 59 418 --.

Signed and Sealed this

Fifteenth Day of June, 2004

JON W. DUDAS
*Acting Director of the United States Patent and Trademark Office*